INVENTORS:
Joseph C. Woodford
and David S. Willson,
BY
ATTORNEY.

Jan. 19, 1954

J. C. WOODFORD ET AL  
FLUID DISPENSING APPARATUS FOR  
HIGH AND LOW PRESSURE RANGES

2,666,446

Filed Nov. 24, 1945

INVENTORS:  
Joseph C. Woodford  
and David S. Willson,  
BY  
ATTORNEY.

Jan. 19, 1954 J. C. WOODFORD ET AL 2,666,446
FLUID DISPENSING APPARATUS FOR
HIGH AND LOW PRESSURE RANGES
Filed Nov. 24, 1945 4 Sheets-Sheet 4

Fig.10.

INVENTORS:
Joseph C. Woodford
and David S. Willson,
BY
ATTORNEY

Patented Jan. 19, 1954

2,666,446

UNITED STATES PATENT OFFICE 2,666,446

FLUID DISPENSING APPARATUS FOR HIGH AND LOW PRESSURE RANGES

Joseph C. Woodford, Spring Lake, and David S. Willson, Muskegon Heights, Mich., assignors to John Wood Company, a corporation of Delaware Application November 24, 1945, Serial No. 630,674

11 Claims. (Cl. 137—225)

Our invention relates to improvements in fluid dispensing apparatus for high and low pressure ranges which is adapted for charging an air receiver to a predetermined pressure. Our invention may be embodied with particular advantage in apparatus used in automobile service stations for inflating the tires of motor vehicles to a predetermined pressure. It is ordinary practice in service stations to highly compress air, say from 100 to 150 pounds per square inch, by a compressor operated by an electric motor, and to store such highly compressed air in a supply tank from which it may be released through dispensing apparatus which is adjustable to predetermine the pressure to which any air receiver may be charged.

Our invention provides a fluid dispensing apparatus of simple mechanical design which operates over a wide range of combinations of pressure adjustment and initial receiver pressure. Our invention operates in controlled cycles of pulsating charges of fluid to a receiver; each charge of fluid being terminated at a short interval after it is initated.

Our invention does not require any appreciable energy drain from, or reduction in the available pressure of, fluid to be delivered to the receiver. This is accomplished by utilizing the energy of a small amount of fluid from the source to furnish power for operating the apparatus, which small amount of fluid is subsequently exhausted to atmosphere.

The embodiment of our invention illustrated includes two separate diaphragm chambers each containing a flexible diaphragm, the pressure upon which is opposed by separate springs. One of said diaphragms is subjected to fluid pressure from the dispensing conduit and the other diaphragm is subjected to fluid pressure from the supply reservoir.

One feature of our invention is that the valve system embodied therein is comprised of but one valve and one valve plunger, with additional valving elements formed as part of the plunger. The valve plunger also functions as a safety valve in the event the main valve should fail to function properly.

Another feature of our invention is the inclusion of means to increase the length of the shots of air when our device has been set for the inflation of receivers at higher pressures. Such lengthening of the shots avoids loss of inflation time when our device is used for the inflating of larger or higher pressure tires. For example, a small size of tire such as is used on a small automobile may be inflated to 30 pounds with, say, 30 shots in order to maintain an accuracy within one pound variation. However, if a large size bus tire having a capacity of four or more times as much air were to be inflated to the same 30 pound setting, it would require 120 shots and the accuracy would be in the order of one-quarter pound, or more accurate than necessary. Therefore, it is preferable to put in four times as much air per shot in order to save inflation time and to avoid unnecessary wear and tear on the mechanism. Add to such condition, the fact that the larger tire more likely would be inflated to 75 pounds, instead of 30 pounds, it can be readily appreciated the advantages which are gained by increasing the length of shots for larger or higher pressure tires.

Our invention comprises the various novel features of construction and arrangement hereafter more definitely specified.

In said drawings, the main casing 1 has a bottom wall 1ª attached thereto by means of screws 1ᵇ. Flexible diaphragms 4 and 5 are clamped between said bottom wall 1ª and the diaphragm cover plate 8 by means of a series of screws 10 which extend through openings in the peripheries of the cover 8 and diaphragms 4 and 5 into screw threaded openings in the bottom wall 1a. Said diaphragms 4 and 5 form fluid tight seals around the peripheries of the diaphragm chambers 2 and 3 which are formed in said cover plate 8.

A supply of fluid under high pressure is connected to the valve casing 12 through the inlet conduit 13 and inlet conduit fitting 14. The conduit 15 connects the valve casing 12 with the fitting 16, the right-hand end 17 of which is adapted to be connected with a fluid service conduit 17a of the well known construction which has at the distal end thereof an air valve chuck 17b for attachment to the valve stem of an automobile tire. Such air chucks are well known in the art and include a valve which closes to prevent air escaping from the hose when the chuck is not attached to a tire stem, but which valve is opened and automatically unseats the tire valve when the chuck is applied to the tire valve stem. The upward extending branch 18 of the fitting 16 is in screw threaded engagement in a screw threaded opening, formed in the boss 21, which is in communication with the inflator diaphragm chamber 3.

Figures 3, 6, 7, 9:
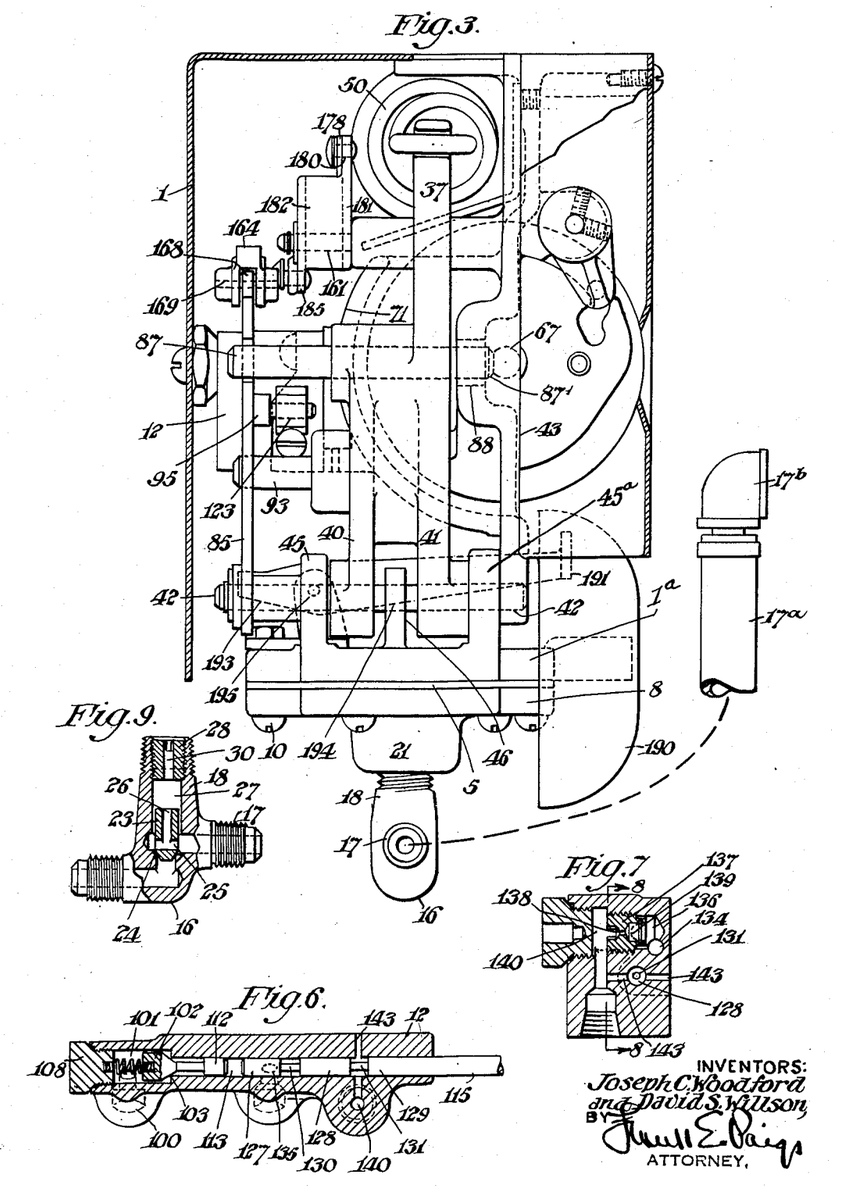
Fig. 3 is a right-hand end elevation of the structure shown in Fig. 1, but with the side wall of the casing shown in section for purposes of clarity.
Fig. 6 is a sectional view of the valve body assembly shown in Fig. 4, taken on the line 6—6 in Fig. 4.
Fig. 7 is a sectional view of the valve body shown in Fig. 1, taken on the lines 7—7 in Fig. 1.
Fig. 9 is a sectional view, partly in elevation, of the check valve assembly indicated in Fig. 1.

As best shown in Fig. 9, the fitting 16 houses the check valve 23 which is adapted to be seated in closed position on its valve seat 24. The check valve 23 is provided with the horizontal passageway 25 and the vertical passageway 26. Said valve 23 is positioned with freedom of movement in the passageway 27 formed in the fitting 16. The upper end of the branch 18 is provided with the screw plug 28 which has an opening 30 therethrough.

The inflator diaphragm 5 is provided with the diaphragm plunger 32 which rests on the upper surface of the diaphragm 5. The plunger 32 has the upwardly extending axial stem 34 which extends through the bearing boss 35 into cooperative relation with the short arm 36 of the bell crank main inflator lever 37. The upper end of the stem 34 may be provided with a felt oiler to afford lubrication for said stem 34 in its movement in the bearing boss 35.

As best shown in Fig. 3, the lower portion of the main inflator lever 37 is enlarged forming the legs 40 and 41. Each leg is provided with an opening forming bearings for the fulcrum pin 42 on which said main lever 37 is pivotally mounted. The inner end of said fulcrum pin 42 is mounted in an opening formed in the wall 43 of the main casing 1, and in the lug 45a of wall 1a. The outer end of said fulcrum pin 42 is supported in an opening in the support lug 45 which is conveniently formed as a part of the bottom wall 1a. Said fulcrum pin 42 is supported intermediate of its length in an opening in the lug 46, which is also formed as part of the bottom wall 1a.

Figures 1, 4, 8:
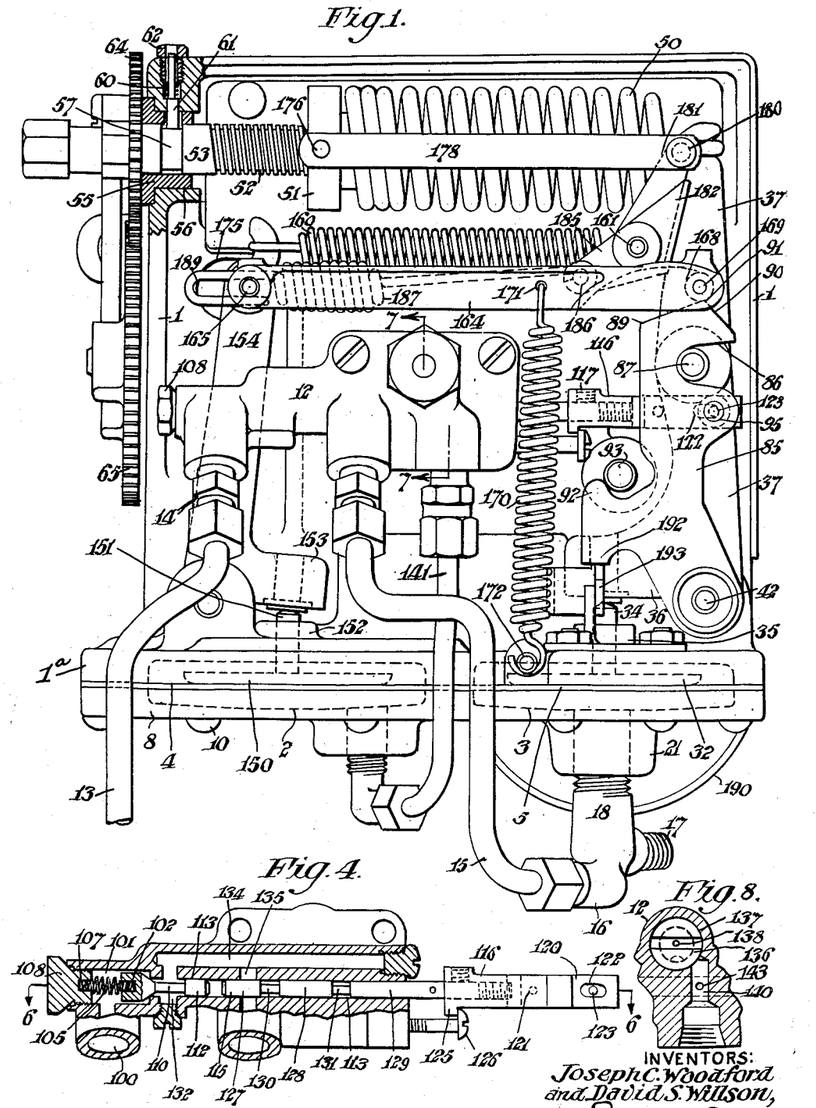
Fig. 1 is an elevation of our invention as embodied in the casing, but with the cover of the casing omitted.
Fig. 4 is a sectional view, partly in elevation, of the valve body unit assembly indicated in Figs. 1 and 2, and taken on the line 4—4 in Fig. 2, and with the valve shown in closed position.
Fig. 8 is a fragmentary sectional view, on an enlarged scale, taken on the lines 8—8 in Fig. 7.

As best shown in Figs. 1 and 3, the inflator spring 50 is operatively connected at its right-hand end to the upper end of the main lever 37. The left-hand end of said spring 50 carries the nut 51 which is in screw threaded engagement with the adjusting screw 52 which, conveniently, is cut on the shaft 53, the left-hand end of which extends exterior to the casing 1. The left-hand end of said shaft 53 is provided with a crank handle (not shown), by which said spring 50 may be adjusted. The stresses of said spring 50 may be increased by turning the shaft 53 clockwise or decreased by turning said shaft 53 counterclockwise. Said shaft 53 is journalled at its left-hand end in the bearing 55 which is press fitted in the flanged opening 56 formed in said main casing 1. Said shaft 53 is provided with the reduced diameter portion 57 and said shaft 53 is prevented from axial displacement in the bearing 55 by means of the spring 60, lock pin 61, and spring retaining nut 62.

The shaft 53 is connected with indicating means for manifesting in pounds the pressure of the fluid to be dispensed and for which the spring 50 has been manually adjusted. Such means include the gear 64 which is rigidly mounted on the shaft 53. Said gear 64 meshes with the gear 65 which is rigidly mounted on the indicator wheel shaft 67.

Figure 10:
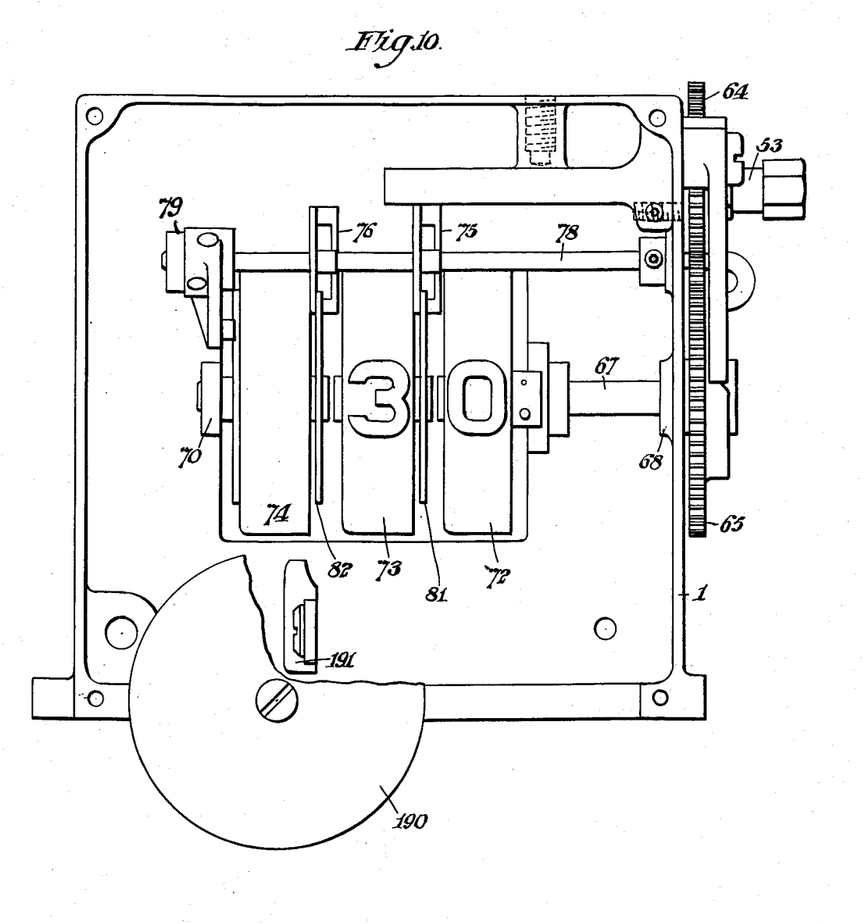
Fig. 10 is an elevation of the opposite side of the structure shown in Fig. 1.

As shown in Fig. 10, the right-hand end of the shaft 67 is journalled in a bearing 68 formed in the wall of the main casing 1, and the left-hand end of said shaft 67 is journalled in the bearing 70 which conveniently is formed as a lug on the wall 43 of the main casing 1. Said shaft 67 has connected therewith the number wheel 72 which has on its circumference a series of numbers from 1 to 9 inclusive and zero. Said wheel 72, which indicates individual pounds, is connected by tens-transfer gearing with the similarly numbered wheel 73, each of the numbers on said wheel 73 representing 10 pounds. Said intermediate wheel 73 is operatively connected with the similarly numbered wheel 74, the numbers on which represent 100 pounds. A connection between the number wheels is conveniently effected by respective transfer pinions 75 and 76 which are loosely journalled on the shaft 78. The right-hand end of said shaft 78 is mounted in the side wall of the casing 1 and the left-hand end of said shaft 78 is mounted in the bracket 79. Said pinions are intermittently turned by respective sectoral gears 81 and 82 in the well known manner of operation of tens-transfer mechanisms and by which, upon a complete rotation of the successive numbered wheels of lower order, the wheel of next higher order is turned one-tenth of a revolution.

As indicated by the dials in Fig. 10, the screw shaft 53 has been manually adjusted to assure dispensation of compressed air through the service conduit to charge an automobile tire, or other receiver, with a fluid pressure of 30 pounds per square inch. For convenience, we have omitted the showing of any of the numbers which appear upon the peripheries of the wheels 72, 73, and 74 except the number 3 on the wheel 73 and the zero on the wheel 72.

The valve cam 85 is pivotally mounted on the outer end of the fulcrum pin 42. Said cam 85 is provided at its upper end with the notch 86 adapted to be engaged by the stud 87 which is rigidly mounted on the main lever 37. The inner end 87' of the stud 87 extends rearwardly from the main lever 37 and is adapted to engage the opposite sides of the opening 88 formed in the wall 43 to limit the counter-clockwise or clockwise movement of the main lever 37 to predetermined limits. Said cam 85 is provided at its upper end with oppositely inclined cam surfaces 89 and 90, the junction of which forms the cam crest 91. As best shown in Fig. 1, said cam 85 is provided with notch portion 92 which is adapted to be engaged by the stop stud 93 rigidly mounted in the middle wall 43 of the main casing 1. Said valve cam 85 is provided with the rearwardly extending stud 95 to which the linkage assembly is connected, as hereinafter described.

As best shown in Figs. 4 to 9 inclusive, the inlet conduit 13 and inlet conduit fitting 14 are in open communication with the inlet passageway 100 formed in the valve casing 12. Said passageway 100 is in open communication with the main valve chamber 101 in which is located the main valve 102. Said main valve 102 is stressed towards its seat 103 by the spring 105, the inner end of which is engaged in the socket 106 formed in the main valve 102 and the outer end of the spring 105 is engaged in the socket 107 formed in the closure plug 108 which is in screw threaded engagement in a screw threaded opening formed at the left-hand end of the valve casing 12.

The main valve 102 is provided with the reduced stem portion 110 and the enlarged end portion 112 which is in sliding engagement in the passageway 113 formed in the valve casing 12. The right-hand end of the enlarged portion 112 of the main valve 102 is adapted to be engaged by the left-hand end of the valving push rod 115. The valving push rod 115 is a substantially airtight sliding free fit in the passageway 113.

The outer end of the push rod 115 is in screw threaded connection with the link 116 and said link 116 is rigidly fastened to the push rod 115 by means of the setscrew 117, as shown in Fig. 1. The right-hand end of the link 116 is bifurcated and provided with the connecting link 120 pivotally mounted within the bifurcated arms on the pivot pin 121. As best shown in Fig. 4, said connecting link 120 is provided at its right-hand end with the elongated slot 122 which is adapted to be engaged by the reduced portion 123 of the stud 95 rigidly mounted in the valve cam 85. As best shown in Fig. 4, the link 116 is provided at its left-hand end with the shoulder 125 which is adapted to engage the head of the stop screw 126, rigidly mounted in the valve casing 12, to limit the movement to the right, as in Fig. 4, of said link assembly 116 and the valving push rod 115 in integral relation therewith.

Figure 5:
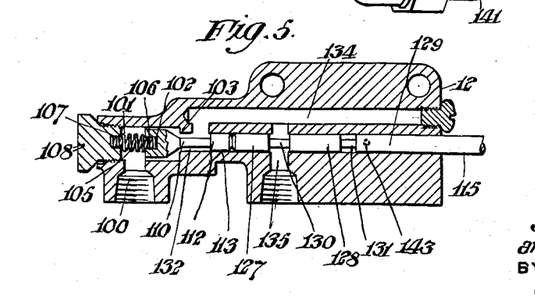
Fig. 5 is a sectional view of the valve body assembly taken on the line 5—5 in Fig. 2, but with the valve shown in open position.

Said valving push rod 115 has the enlarged portions 127, 128 and 129. The reduced section 130 is formed between the enlarged portions 127 and 128, and the reduced portion 131 is formed between the enlarged portions 128 and 129. As best shown in Figs. 4 and 5, the chamber 132 is formed at the outlet side of the main valve 102, and said chamber 132 is in open communication with the passageways 134 and 135. The enlarged portion 127 of the valving push rod 115 acts as a valve to control the flow of air from the passageway 135 to the conduit 15, in the manner hereinafter described.

As best shown in Figs. 6, 7 and 8, the passageway 134 is also in open communication with the chamber 136. Said chamber 136 is provided with the closure plug 137 which has the restricted orifice 138 therethrough. Said plug 137 is provided with the screen member 139. Said restricted orifice 138 is in open communication with the passageway 140 leading to the conduit 141 which is in open communication with the motor diaphragm chamber 2. Said passageway 140 is also in communication with the exhaust port 143 which is open to atmosphere at its outer end. As best shown in Fig. 6, when the reduced section 131 of the valving push rod 115 is presented across the exhaust port opening 143, open communication is afforded between the passageway 140 through the exhaust port 143 to atmosphere. When the valving push rod 115 is in the position indicated in Fig. 5, the enlarged portion 129 thereof is presented across the exhaust port 143 to close said exhaust port and prevent the flow of air to atmosphere.

Figure 2:
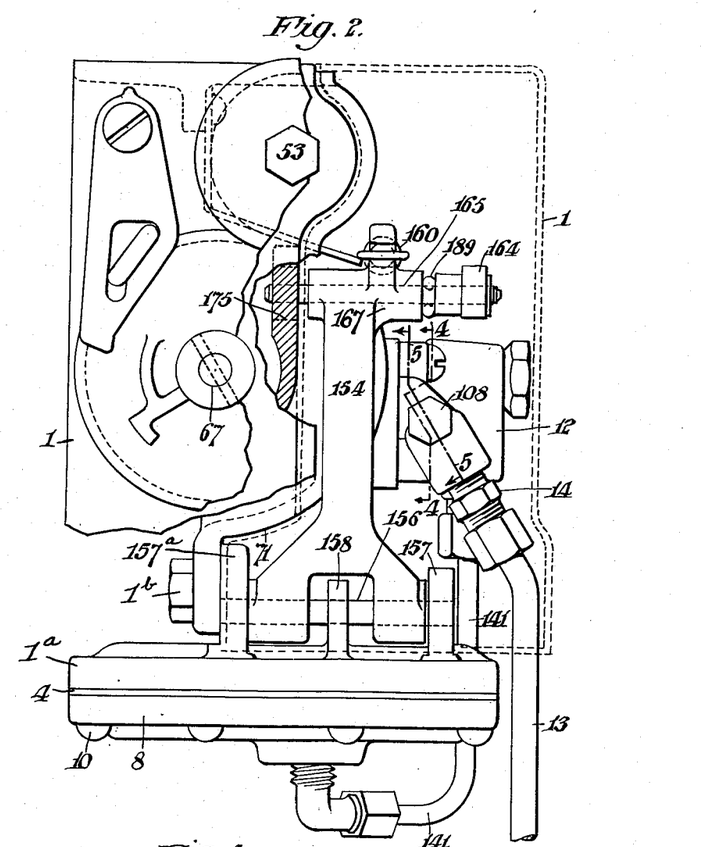
Fig. 2 is a left-hand end elevation, partly in section, of the structure shown in Fig. 1, but with the casing partly broken away to show the operating mechanism.

The motor diaphragm 4 is provided with the diaphragm plunger 150 which rests upon the upper surface of the diaphragm 4. The plunger 150 has the upwardly extending axial stem 151 which extends through the bearing boss 152 into cooperative relation with the short arm 153 of the motor lever 154. The upper end of the stem 151 may be provided with a felt oiler to afford lubrication for said stem 151 in its movement in the bearing boss 152. As best shown in Fig. 2, the lower portion of the motor lever 154 is bifurcated and provided with openings forming bearings for the fulcrum pin 156 on which said motor lever 154 is pivotally mounted. The inner end of the fulcrum pin 156 is rigidly mounted in an opening formed in the lug 157ª of the bottom wall 1ª. The outer end of said fulcrum pin 156 is supported in an opening in the support lug 157 which is formed conveniently on the bottom wall 1ª. Said fulcrum pin 156 is supported intermediate of its ends in an opening formed in the lug 158 also formed on the bottom wall 1ª.

As best shown in Figs. 1 and 2, the motor lever spring 160 is operatively connected at its left-hand end to the upper end of the motor lever 154. The right-hand end of the spring 160 is anchored to the stud 161 which is rigidly mounted in a boss formed on the wall 43 of the main casing 1.

The roller lever 164 is pivotally mounted at its left-hand end on the pin 165 which is rigidly fixed in the boss 167 formed at the upper part of the motor lever 154. The right-hand end of the lever 164 is provided with the roller 168 pivotally mounted on the pin 169 fixed in the lever 164. As best shown in Fig. 1, the roller 168 is stressed towards engaging contact with the cam surfaces 89 and 90 of the cam 85 by means of the spring 170. The upper end of the spring 170 is engaged in the opening 171 formed in the lever 164, intermediate of its ends, and the lower end of the spring 170 engages and encircles the pin 172 which is rigidly fixed in the bottom wall 1ª. The spring 170 continually stresses the lever 164 in a clockwise direction.

As best shown in Fig. 2, the pin 165 projects from the motor lever 154 and is adapted to engage the opposite sides of the opening 175 formed in the wall 43 to limit the clockwise or counter-clockwise movement of the motor lever 154 to predetermined limits.

Our improved means to vary the length of the shots of fluid are best shown in Figs. 1 and 3. The nut 51 is provided with the stud 176 on which the left-hand end of the link 178 is pivotally mounted. The right-hand end of the link 178 is pivotally connected to the pin 180 rigidly fixed in the upper end of the arm 181 of the bell crank lever 182. Said bell crank lever 182 is pivotally mounted on the stud 161, which also serves as the anchor for the right-hand end of the spring 160 as heretofore described. The lever 182 includes the arm 185 in which the stud 186 is rigidly mounted. As best shown in Fig. 1, the right-hand end of the tension spring 187 encircles and engages the stud 186. The left-hand end of the tension spring 187 is formed into an elongated U-shaped eye 189 which encircles the pin 165 rigidly fixed in the boss 167 formed at the upper part of the motor lever 154. At the lowest indicator setting of our device wherein the nut 51 has been moved to its furtherest position to the right, as viewed in Fig. 1, such movement of the nut 51 to the right has caused the bell crank lever 182 to move clockwise which moves the tension spring 187, connected to the bell crank lower arm 185, to the left. Accordingly, when the device is adjusted to the lowest indicator setting, movement of the motor lever 154 in its cycle merely causes the pin 165 to be moved back and forth in the elongated eye 189 and the tension spring 187 is not effective.

Referring to Fig. 1, when the nut 51 has been moved to the left as a result of a setting of the device for a higher pressure inflation, movement of the nut 51 to the left causes the bell crank lever 182 to be moved counter-clockwise about its pivot 151 which causes the spring 187 to be moved to the right so that the pin 165, carried by the motor lever 154, will engage the elongated eye 189 of the spring 187, thereby causing tension in the spring 187 so as to resist the motor lever 154 when it is moved in a counter-clockwise direction. Accordingly, additional air pressure on the motor diaphragm 4 is required to enable the motor lever 154 to be moved in a counter-clockwise direction. As air flows to the motor diaphragm chamber 2 at a relatively constant rate through the restricted orifice 138, it therefore requires a longer time interval to accumulate sufficient pressure on the motor diaphragm 4 to effect movement of the motor lever 154 to valve closing position to the left when the effective forces of the tension spring 187 augment the effective forces of the motor lever spring 160. It is to be noted that as the dial setting of our device becomes progressively higher, the effective tension of the spring 187 is progressively increased, thus resulting in a progressive increase in the length of the individual charges of air which permits faster inflation with a practical degree of accuracy of final inflation pressure at the higher dial settings.

We find it convenient to provide our device with means to audibly indicate the beginning, continuance, and termination of the delivery of air. Such audible indicating means includes a bell 190 which is arranged to be struck by the bell clapper 191 upon each pulsation of the mechanism. The clapper 191 is operated by the arm 192 of the valve cam 85 coming into engagement with the arm 193 of the lever 194 pivotally mounted on the pin 195.

*Operation*

Our fluid dispensing apparatus operates as follows:

Assuming that it is desired to inflate an automobile tire to a pressure of 30 pounds per sq. in., the operator turns the crank handle at the end of the shaft 53 to move the indicating dials to a position where the numeral 30 appears, as indicated in Fig. 10. The operator then presses the air chuck 17ᵇ upon the stem of the automobile tire which opens the tire valve and likewise moves the valve in the air chuck 17ᵇ to open position against the pressure of air in the hose 17ᵃ. If the pressure in the tire is below the pressure of 30 pounds to which the apparatus has been set, the air under high pressure in the hose 17ᵃ, fitting 16, inflator diaphragm chamber 3, etc., tends to equalize with the pressure in the tire, thereby reducing the pressure in the inflator diaphragm chamber 3.

When the pressure in the inflator diaphragm chamber 3 is reduced to a point where such pressure no longer can overcome the effective forces of the spring 50, the spring 50 moves the pivotally mounted main inflator lever 37 counter-clockwise on its fulcrum pin 42. The stud 87 being rigidly fixed in the lever 37, counter-clockwise movement of the lever 37 causes the stud 87 to also be moved counter-clockwise to engage the left-hand side, as viewed in Fig. 1, of the notch 86 of the valve cam 85, and moves said valve cam 85 counter-clockwise. The crest 91 of the valve cam 85 is formed at the junction of the oppositely inclined cam surfaces 89 and 90. When the crest 91 of the cam 85 has moved a sufficient distance to the left under the roller 168, the cam 85 is moved suddenly in a counter-clockwise direction because of the tension of the spring 170 connected to the lever 164 which carries the roller 168.

Movement of the main lever 37 in a counter-clockwise direction is limited by the inner end 87' of the stud 87 coming into contact with the left-hand side of the opening 88 formed in the wall 43. The main lever 37 is thus permitted to be moved only a sufficient distance to cause the crest 91 of the cam 85 to pass beneath the roller 168, and at which point the cam 85 has not been moved sufficiently to cause the link 116 and valving push rod 115 to be moved to valve opening position. After the crest 91 of the cam 85 has passed beneath the roller 168, the further counter-clockwise movement of the cam 85 is effected through the forces of the spring 170 transmitted through the roller 168 to the inclined cam surface 90.

The cam 85 moves counter-clockwise until its movement is arrested by the right-hand side of the notch 92 coming into engaging contact with the stud 93 which is rigidly mounted in the main casing. As the valve cam 85 moves suddenly counter-clockwise, the reduced portion 123 of the stud 95 mounted in the valve cam 85 comes into engagement with the left-hand side of the elongated slot 122 in the link 116 and moves the link 116 and valving push rod 115 to the left, and from the position shown in Fig. 4 to the position shown in Fig. 5.

Movement of the valving push rod 115 to the left causes its left-hand end to come into engagement with the right-hand end of the enlarged portion 112 of the main valve 102 which causes said main valve 102 to be opened against the effective forces of its spring 105.

When the valving push rod 115 has been moved to the left and from the position shown in Figs. 4 and 6 to the position shown in Fig. 5, the reduced portion 131 of the push rod 115 is moved to the left past the exhaust port 143 and the full diameter enlarged portion 129 of the push rod causes the exhaust port 143 to become closed.

When the main valve 102 is in open position, air under high pressure flows through the inlet conduit 13, conduit fitting 14, passageway 100, main valve chamber 101, past the open main valve 102, chamber 132, passageway 134, passageway 135 around the reduced section 130 which is presented in registry with the passageway 135, to the conduit 15, and thence to the T-fitting 16, hose 17ᵃ, chuck 17ᵇ, and past the open tire valve into the tire. High pressure air also flows around the open check valve 23, through the restricted opening 30 to the inflator diaphragm chamber 3 beneath the diaphragm 5. When the pressure in the inflator diaphragm chamber 3 rises to a point at which the effective forces of the spring 50 are overcome, the main lever 37 is moved clockwise.

When the main valve 102 is open, air under high pressure also flows from the passageway 134 to the chamber 136, through the screen member 139 in the closure plug 137, through the restricted orifice 138 to the passageway 140, and thence to the conduit 141 and to the motor diaphragm chamber 2 beneath the motor diaphragm 4. Because of the restrictive opening 138, air flows to the motor diaphragm chamber 2 comparatively slowly and pressure in the motor diaphragm chamber 2 is built up gradually against the motor diaphragm 4. As hereinabove stated, the movement of the valving push rod 115 to the left has caused the enlarged portion 129 to effect closure of the exhaust port 143.

As pressure on the motor diaphragm is increased, the motor lever 154, pivoted on the fulcrum pin 156, is moved counter-clockwise against the effective forces of the spring 160, the right-hand end of which is anchored on the stud 161. Counter-clockwise movement of the motor lever 154 causes the roller lever 164, pivoted on the stud 165 carried by the motor lever 154, to be moved to the left as in Fig. 1. Such movement of the lever 164 to the left causes the roller 168 to ride up the inclined cam surface 90 of the cam 85 until the roller 168 reaches the crest 91 of said cam 85. Whereupon, the cam 85 is moved suddenly in a clockwise direction as the roller 168 moves down the inclined cam surface 89 of the cam 85 under the effective forces of the spring 170. The cam 85 moves clockwise until it is stopped by the left-hand side of the notch 92 coming into engagement with the pin 93 or by the left-hand side of the notch 86 coming into engagement with the stud 87 rigidly mounted on the main lever 37.

As the cam 85 is moved clockwise, it is followed by the link assembly 116 and valving push rod 115 connected thereto until the shoulder 125 on the link 116 comes into engagement with the underside of the head of the stop screw 126. When the valving push rod 115 is moved to the right as above described, the main valve 102 is closed by its spring 105, thereby shutting off high pressure air from the inlet conduit 13 to the conduit 15 to which the dispensing hose 17a is connected.

When the valving push rod 115 has been moved to the right, as shown in Figs. 6 and 4, the reduced section 131 is presented in registry with the exhaust port 143, thereby permitting air to escape quickly to the atmosphere from the motor diaphragm chamber 2, through the conduit 141, passageway 140 and exhaust port 143. As air is exhausted to the atmosphere from the diaphragm chamber 2, the pressure is quickly reduced on the motor diaphragm 4 which enables the spring 160 to move the motor lever 154 in a clockwise direction until the pin 165 stops against the right-hand side of the opening 175 formed in the wall 43.

When the valving plunger 115 is moved to the right as described above, not only is the exhaust port 143 opened to atmosphere, but the reduced section 130 has been moved out of alignment with the opening 135 and the enlarged portion 127 presented across said passageway 135 to completely close it, thereby preventing high pressure air flowing to the conduit 15, hose and tire, in case the valve 102 might fail to close for any reason. In other words, the enlarged portion 127 functions as an auxiliary or safety shut-off valve in case the valve 102 fails to close.

As the roller lever 164 is moved to the right, as explained above, the roller 168 is also restored to its initial position toward the right, where it approaches the crest 91 of the inclined cam surfaces 89 and 90 of the cam 85, but holds the cam 85 toward the right against the stop stud 93 unless the main lever 37 again initiates a movement of the cam 85 in a counter-clockwise direction to start another cycle.

When the main valve 102 has been closed as described above, the pressure of air in the inflator diaphragm chamber 3 again tends to equalize with the pressure in the tire, or receiver, and if the pressure in the tire has not yet reached that to which the device is set, the effective forces of the spring 50 again move the lever 37 counter-clockwise to again move the cam 85 counter-clockwise to cause an opening of the valve 102 to allow another surge of air to flow to the tire as described above. It is to be noted that the check valve 23 permits air to pass freely from the conduit 15 to the hose 17a when the valve 102 is open, but said check valve 23 prevents return of air to the conduit 15 when the valve 102 is closed, thus maintaining air pressure in the hose 17a and diaphragm chamber 3 except when the air chuck 17b is connected to the tire. The hose 17a is in constant communication with the diaphragm chamber 3 through the check valve opening 25, opening 26, and restricted opening 30.

When the pressure in the receiver reaches the pressure for which the device is adjusted, the pressure in the diaphragm chamber 3 is sufficient to retain the lever 37 in a position at, or approaching, the limit of its clockwise movement. Accordingly, the main valve 102 remains closed and any further communication of air under high pressure from the inlet conduit 13 to the conduit 141 and to the outlet conduit 15 is prevented. Thereupon, the operator removes the chuck 17b from the stem of the tire and the air under high pressure in the hose 17a holds the valve of the air chuck 17b closed. Of course, when the chuck 17b is removed from the valve stem of the automobile tire, the spring of the tire valve moves that valve to closed position and retains the desired set pressure of air in the tire.

Tire inflation is accomplished with our device by supplying a succession of charges or shots of high pressure air to the hose, and in order to assure a practical degree of accuracy of final pressure in the receiver, it is desirable to adjust the amount of air per charge in relation to the size of the tire, or the inflation pressure required. For example, if charges of air are of a value so as to provide an inflation pressure increment of one pound or less in small or low pressure tires, such charges would provide much smaller increments of inflation pressure in very large tires. This would result in an objectionably large number of shots, and corresponding loss of time, in the inflation of large higher pressure tires. We, therefore, provide means for increasing automatically the sizes of charges of air as our device is adjusted for higher pressures.

When the adjusting screw 53 is turned clockwise to increase the indicator setting, the main spring nut 51 is moved to the left, as in Fig. 1, by the screw thread 52, thus increasing the tension of the spring 50 on the main lever 37. The link 178 being pivotally connected to the nut 51, movement of the nut 51 to the left, as in Fig. 1, also causes the link 178 to be moved to the left. As the link 178 is pivotally connected to the upper end of the bell crank lever 182, movement of the link 178 to the left causes said bell crank lever to move in a counter-clockwise movement. Such counter-clockwise movement of the bell crank lever 182 causes the tension spring 187 to be moved to the right so that the elongated U-shaped eye 189 at the left-hand end of the tension spring 187 will be moved to the right to a position where it will be engaged by the pin 165 rigidly fixed in the motor lever 154. Therefore, additional air pressure on the diaphragm 4 is required to move the motor lever counter-clockwise, as the air pressure in the diaphragm chamber 2 has to overcome the effective forces of the spring 160 augmented by the effective forces of the tension spring 187. Since air flows to the diaphragm chamber 2 at a relatively constant rate through the restricted orifice 138, it therefore requires a longer time interval to accumulate sufficient pressure on the motor diaphragm 4 to move the motor lever 154 in a counter-clockwise direction which effects the closing of the valve 102 in the manner heretofore described. Accordingly, the valve 102 remains open for a longer interval of time which results in a larger charge of air being allowed to flow to the tire, or receiver, during a cycle. Thus, as the dial setting becomes progressively higher, the effective tension of the spring 187 is progressively increased, which results in the charges of air being progressively increased with an increase of dial setting to permit faster inflation and a practical accuracy of final inflation pressure.

It is to be noted that the right-hand position of the valve plunger 115 is determined by the stop screw 126 and that the link 116 is provided with the elongated slot 122 so that when the cam 85 is at its extreme clockwise position against the stud 93, there is clearance between the stud 123 and the left-hand end of the slot 122, as best shown in Fig. 4. Thus, when a cycle of operation is initiated by the lever 37, the initial motion of the cam 85 under the roller 168 is resisted only by the tension of the spring 170. Such lost motion provided by the elongated opening 122 permits the mechanism to be calibrated accurately. Accurate calibration would not be possible if the lever 37 had to initiate cycles of operation against variable air pressures on the valving push rod 115 and against the movement of said push rod 115 in the passageway 113.

It is obvious that various modifications may be made in our invention without departing from the essential features thereof as defined in the appended claims, and, therefore, we do not desire to limit ourselves to the precise details of construction and arrangement hereinabove set forth.

We claim:

1. A fluid dispensing apparatus for inflating a receiver to a predetermined pressure with surges of air under pressure, including an inlet conduit adapted for connection with a source of supply of air under pressure; an outlet conduit adapted for connection with a receiver; a motor diaphragm chamber and an inflator diaphragm chamber, each chamber containing pressure sensitive means including a reciprocatory diaphragm; conduit means through which air under pressure is supplied to said chambers; valve means controlling communication between said inlet conduit and said diaphragm chambers and outlet conduit; means operatively connecting said valve means with said pressure sensitive means; respective springs opposed to the fluid pressure on said motor diaphragm and said inflator diaphragm; means for adjustably varying the tension of the spring opposed to said inflator diaphragm; a motor lever operatively connecting said motor diaphragm with the spring opposed to the fluid pressure on said motor diaphragm; a main lever operatively connecting said inflator diaphragm with the spring opposed to the fluid pressure on said inflator diaphragm; auxiliary tension means opposed to the fluid pressure on said motor diaphragm and adapted selectively for operative connection with said motor lever; and means operatively connecting said auxiliary tension means with said means for adjustably varying the tension of the spring opposed to said inflator diaphragm; whereby, the surges of air under pressure are increased in volume with an increase in the predetermined pressure setting of said apparatus.

2. A fluid dispensing apparatus for inflating a receiver to a predetermined pressure with surges of air under pressure, including an inlet conduit adapted for connection with a source of supply of air under pressure; an outlet conduit adapted for connection with a receiver; a motor diaphragm chamber and an inflator diaphragm chamber, each chamber containing pressure sensitive means including a reciprocatory diaphragm; conduit means through which air under pressure is supplied to said chambers; a valve controlling communication between said inlet conduit and said diaphragm chambers and outlet conduit; means operatively connecting said valve with said pressure sensitive means; respective springs opposed to the fluid pressure on said motor diaphragm and said inflator diaphragm; means for adjustably varying the tension of the spring opposed to said inflator diaphragm; a motor lever operatively connecting said motor diaphragm with the spring opposed to the fluid pressure on said motor diaphragm; and a main lever operatively connecting said inflator diaphragm with the spring opposed to the fluid pressure on said inflator diaphragm; an auxiliary tension spring opposed to the fluid pressure on said motor diaphragm and adapted selectively for operative connection with said motor lever; and means operatively connecting said auxiliary tension spring with said means for adjustably varying the tension of the spring opposed to said inflator diaphragm; whereby, the surges of air under pressure are increased in volume with an increase in the predetermined pressure setting of said apparatus.

3. A fluid dispensing apparatus for inflating a receiver to a predetermined pressure with surges of air under pressure, including an inlet conduit adapted for connection with a source of supply of air under pressure; an outlet conduit adapted for connection with a receiver; a motor diaphragm chamber and an inflator diaphragm chamber, each chamber containing pressure sensitive means including a reciprocatory diaphragm; conduit means through which air under pressure is supplied to said chambers; a valve controlling communication between said inlet conduit and said diaphragm chambers and outlet conduit; means operatively connecting said valve with said pressure sensitive means; respective springs opposed to the fluid pressure on said motor diaphragm and said inflator diaphragm; means for adjustably varying the tension of the spring opposed to said inflator diaphragm; a motor lever operatively connecting said motor diaphragm with the spring opposed to the fluid pressure on said motor diaphragm; and a main lever operatively connecting said inflator diaphragm with the spring opposed to the fluid pressure on said inflator diaphragm; an auxiliary tension spring opposed to the fluid pressure on said motor diaphragm and adapted selectively for operative connection with said motor lever; and lever means operatively connecting said auxiliary tension spring with said means for adjustably varying the tension of the spring opposed to said inflator diaphragm; whereby, the surges of air under pressure are increased in volume with an increase in the predetermined pressure setting of said apparatus.

4. A fluid dispensing apparatus for inflating a receiver to a predetermined pressure with surges of air under pressure, including an inlet conduit adapted for connection with a source of supply of air under pressure; an outlet conduit adapted for connection with a receiver; a motor diaphragm chamber and an inflator diaphragm chamber, each chamber containing pressure sensitive means including a reciprocatory diaphragm; conduit means through which air under pressure is supplied to said chambers; a valve controlling communication between said inlet conduit and said diaphragm chambers and outlet conduit; means operatively connecting said valve with said pressure sensitive means; respective springs opposed to the fluid pressure on said motor diaphragm and said inflator diaphragm; means for adjustably varying the tension of the spring opposed to said inflator diaphragm; a motor lever operatively connecting said motor diaphragm with the spring opposed to the fluid pressure on said motor diaphragm; and a main lever operatively connecting said inflator diaphragm with the spring opposed to the fluid pressure on said inflator diaphragm; an auxiliary tension spring adapted selectively to oppose the fluid pressure on said motor diaphragm; with means connected to said auxiliary tension spring to selectively connect said auxiliary tension spring with said motor lever; and lever means operatively connecting said auxiliary tension spring with said means for adjustably varying the tension of the spring opposed to said inflator diaphragm; whereby, the surges of air under pressure are increased in volume with an increase in the predetermined pressure setting of said apparatus.

5. A structure as in claim 4; wherein the means selectively connecting said auxiliary tension spring with said motor lever include an elongated eye member formed on said auxiliary tension spring and adapted to be engaged by means carried by said motor lever.

6. A structure as in claim 4; wherein the means selectively connecting said auxiliary tension spring with said motor lever include an elongated eye member formed on said auxiliary tension spring and adapted to be engaged by a pin carried by said motor lever.

7. A fluid dispensing apparatus for inflating a receiver to a predetermined pressure with surges of air under pressure, including an inlet conduit adapted for connection with a source of supply of air under pressure; an outlet conduit adapted for connection with a receiver; a motor diaphragm champer and an inflator diaphragm chamber, each chamber containing pressure sensitive means including a reciprocatory diaphragm; conduit means through which air under pressure is supplied to said chambers; respective springs opposed to the fluid pressure on said motor diaphragm and said inflator diaphragm; means for adjustably varying the tension of the spring opposed to said inflator diaphragm; means operatively connecting said motor diaphragm with the spring opposed to the fluid pressure on said motor diaphragm; means operatively connecting said inflator diaphragm with the spring opposed to the fluid pressure on said inflator diaphragm; a main valve between said inlet conduit and said outlet conduit controlling communication both between said inlet conduit and said outlet conduit and between said inlet conduit and said motor diaphragm chamber; with means, including a snap action mechanism, operatively connecting said main valve and said pressure sensitive means; a valving plunger operatively connected to said snap action mechanism and arranged to effect operation of said main valve; an exhaust conduit connecting said motor diaphragm chamber with the atmosphere; and valve means formed on said plunger to effect opening and closing of communication to atmosphere through said exhaust conduit.

8. A fluid dispensing apparatus for inflating a receiver to a predetermined pressure with surges of air under pressure, including an inlet conduit adapted for connection with a source of supply of air under pressure; an outlet conduit adapted for connection with a receiver; a motor diaphragm chamber and an inflator diaphragm chamber, each chamber containing pressure sensitive means including a reciprocatory diaphragm; conduit means through which air under pressure is supplied to said chambers; respective springs opposed to the fluid pressure on said motor diaphragm and said inflator diaphragm; means for adjustably varying the tension of the spring opposed to said inflator diaphragm; means operatively connecting said motor diaphragm with the spring opposed to the fluid pressure on said motor diaphragm; means operatively connecting said inflator diaphragm with the spring opposed to the fluid pressure on said inflator diaphragm; a main valve between said inlet conduit and said outlet conduit controlling communication both between said inlet conduit and said outlet conduit and between said inlet conduit and said motor diaphragm chamber; with means, including a snap action mechanism, operatively connecting said main valve and said pressure sensitive means; a valving plunger operatively connected to said snap action mechanism and arranged to effect operation of said main valve; an exhaust conduit connecting said motor diaphragm chamber with the atmosphere; a first valve means formed on said plunger to effect opening and closing of communication to atmosphere through said exhaust conduit; and safety shut-off valve means formed on said plunger to effect closing of communication between said inlet conduit and said outlet conduit when said first valve means is moved to open position to effect communication to atmosphere through said exhaust conduit.

9. A fluid dispensing apparatus for inflating a receiver to a predetermined pressure with surges of air under pressure, including an inlet conduit adapted for connection with a source of supply of air under pressure; an outlet conduit adapted for connection with a receiver; a motor diaphragm chamber and an inflator diaphragm chamber, each chamber containing pressure sensitive means including a reciprocatory diaphragm; conduit means through which air under pressure is supplied to said chambers; valve means controlling communication between said inlet conduit and said diaphragm chambers and outlet conduit; means operatively connecting said valve means with said pressure sensitive means; respective springs opposed to the fluid pressure on said motor diaphragm and said inflator diaphragm; and means for adjustably varying the tension of the spring opposed to said inflator diaphragm; auxiliary tension means opposed to the fluid pressure on said motor diaphragm; and means operatively connecting said auxiliary tension means with said means for adjustably varying the tension of the spring opposed to said inflator diaphragm; whereby, the surges of air under pressure are increased in volume with an increase in the predetermined pressure setting of said apparatus.

10. A fluid dispensing apparatus for inflating a receiver to a predetermined pressure with surges of air under pressure, including an inlet conduit adapted for connection with a source of supply of air under pressure; an outlet conduit adapted for connection with a receiver; a motor diaphragm chamber and an inflator diaphragm chamber, each chamber containing pressure sensitive means including a reciprocatory diaphragm; conduit means through which air under pressure is supplied to said chambers; valve means controlling communication between said inlet conduit and said diaphragm chambers and outlet conduit; means operatively connecting said valve means with said pressure sensitive means; respective springs opposed to the fluid pressure on said motor diaphragm and said inflator diaphragm; auxiliary surge lengthening means opposed to the fluid pressure on said motor diaphragm; and means operatively connecting said auxiliary surge lengthening means with said means for adjustably varying the tension of the spring opposed to said inflator diaphragm; whereby, the surges of air under pressure are increased in volume with an increase in the predetermined pressure setting of said apparatus.

11. A fluid dispensing apparatus for inflating a receiver to a predetermined pressure with surges of air under pressure, including an inlet conduit adapted for connection with a source of supply of air under pressure; an outlet conduit adapted for connection with a receiver; a motor diaphragm chamber and an inflator diaphragm chamber, each chamber containing pressure sensitive means including a reciprocatory diaphragm; conduit means through which air under pressure is supplied to said chambers; respective springs opposed to the fluid pressure on said motor diaphragm and said inflator diaphragm; means for adjustably varying the tension of the spring opposed to said inflator diaphragm; means operatively connecting said motor diaphragm with the spring opposed to the fluid pressure on said motor diaphragm; means operatively connecting said inflator diaphragm with the spring opposed to the fluid pressure on said inflator diaphragm; and a snap action mechanism; a main valve between said inlet conduit and said outlet conduit controlling communication both between said inlet conduit and said outlet conduit and between said inlet conduit and said motor diaphragm chamber; with means operatively connected to said snap action mechanism and arranged to effect operation of said main valve; an exhaust conduit connecting said motor diaphragm chamber with the atmosphere; and valve means to effect opening and closing of communication to atmosphere through said exhaust conduit.

JOSEPH C. WOODFORD.
DAVID S. WILLSON.

References Cited in the file of this patent

UNITED STATES PATENTS

| Number | Name | Date |
|---|---|---|
| 1,918,341 | Knaak | July 18, 1933 |
| 2,042,190 | Regan | May 26, 1936 |
| 2,303,316 | Barker | Dec. 1, 1942 |
| 2,307,314 | Willson | Jan. 5, 1943 |